(12) United States Patent
Nagasawa

(10) Patent No.: US 9,329,814 B2
(45) Date of Patent: May 3, 2016

(54) PORTABLE TERMINAL APPARATUS, IMAGE PROCESSING APPARATUS REGISTRATION METHOD FOR THE PORTABLE TERMINAL APPARATUS, AND RECORDING MEDIUM

(71) Applicant: KONICA MINOLTA, INC., Chiyoda-ku (JP)

(72) Inventor: Kenichi Nagasawa, Takatsuki (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/460,431

(22) Filed: Aug. 15, 2014

(65) Prior Publication Data

US 2015/0060547 A1  Mar. 5, 2015

(30) Foreign Application Priority Data

Aug. 30, 2013  (JP) .................................. 2013-179221

(51) Int. Cl.
*G06K 7/10* (2006.01)
*G06F 3/12* (2006.01)
(Continued)

(52) U.S. Cl.
CPC ............ *G06F 3/1236* (2013.01); *G06F 3/1204* (2013.01); *G06F 3/1285* (2013.01); *G06F 3/1292* (2013.01); *G06K 7/1417* (2013.01); *G06K 15/4045* (2013.01);
(Continued)

(58) Field of Classification Search
USPC ............... 235/454, 462.09; 455/456.3, 456.5; 709/217
See application file for complete search history.

(56) References Cited

U.S. PATENT DOCUMENTS

2007/0133843 A1  6/2007  Nakatani
2009/0001173 A1*  1/2009  Sevier et al. ............. 235/462.41
2013/0250358 A1*  9/2013  Suzuki ........................ 358/1.15
(Continued)

FOREIGN PATENT DOCUMENTS

| JP | 2003-131827 A | 5/2003 |
| JP | 2006-001063 A | 1/2006 |
| JP | 2007-034443 A | 2/2007 |

(Continued)

OTHER PUBLICATIONS

Office Action (Notification of Reasons for Refusal) issued on Aug. 4, 2015, by the Japanese Patent Office in corresponding Japanese Patent Application No. 2013-179221 and an English translation of the Office Action. (8 pages).

*Primary Examiner* — Ahshik Kim

(74) *Attorney, Agent, or Firm* — Buchanan Ingersoll & Rooney PC

(57) ABSTRACT

A portable terminal apparatus includes: a two-dimensional code obtaining portion that obtains a two-dimensional code indicating address information; an address information judgment portion that analyzes the two-dimensional code and judges whether or not the two-dimensional code includes an IP address; an access portion that accesses an image processing apparatus residing at the IP address upon the two-dimensional code being judged as including the IP address; an MIB information obtaining portion that obtains MIB information from the image processing apparatus; and a registration portion that judges on the basis of the MIB information whether or not the image processing apparatus can be operated from the portable terminal apparatus by an application being activated, the application being installed on the portable terminal apparatus, and registers information for use of the image processing apparatus upon the image processing apparatus being judged as being able to be operated from the portable terminal apparatus.

21 Claims, 6 Drawing Sheets

(51) Int. Cl.
*H04N 1/00* (2006.01)
*G06K 15/00* (2006.01)
*G06K 7/14* (2006.01)

(52) U.S. Cl.
CPC ...... *H04N 1/00307* (2013.01); *H04N 1/00334* (2013.01); *H04N 1/00363* (2013.01); *H04N 2201/0039* (2013.01); *H04N 2201/0075* (2013.01); *H04N 2201/0096* (2013.01); *H04N 2201/3208* (2013.01)

(56) References Cited

U.S. PATENT DOCUMENTS

2013/0342865 A1* 12/2013 Shekher et al. ............ 358/1.14
2014/0036299 A1* 2/2014 Norota ........................ 358/1.14

FOREIGN PATENT DOCUMENTS

| JP | 2007-164448 A | 6/2007 |
| JP | 2012-218223 A | 11/2012 |

* cited by examiner

| No. | Title | Information |
|---|---|---|
| 1 | IPv4 Address | 192.168.2.2 |
| 2 | IPv6 Address | 1234:3456:2345:1234 |
| 3 | DNS Name | ABC.DEF.COM |
| 4 | MAC Address | AA:BB:CC:DD:EE:FF |
| 5 | Printer Language | PCL,PS,PDF,JPEG |
| 6 | SysOID (SysObjectID) | 1.2.3.4.22222.2.2.2.2 |
| 7 | Status information | Run out of paper |
| 8 | Option information | ADF |
| 9 | DHCP Configuration | ON |
| 10 | ModelName(ModelName) | KONICA MFP1 |
| 11 | SysName(SysName) | 6F MFP |

PORTABLE TERMINAL APPARATUS, IMAGE PROCESSING APPARATUS REGISTRATION METHOD FOR THE PORTABLE TERMINAL APPARATUS, AND RECORDING MEDIUM

This application claims priority under 35 U.S.C. §119 to Japanese Patent Application No. 2013-179221 filed on Aug. 30, 2013, the entire disclosure of which is incorporated herein by reference in its entirety.

BACKGROUND OF THE INVENTION

1. Field of the Invention

The present invention relates to: a portable terminal apparatus such as a smartphone or a tablet computer terminal; a method of registering an image processing apparatus, which is to be implemented by the portable terminal apparatus; and a non-transitory computer-readable recording medium having a program to make a computer of the portable terminal apparatus register an image processing apparatus.

2. Description of the Related Art

The following description sets forth the inventor's knowledge of related art and problems therein and should not be construed as an admission of knowledge in the prior art.

In recent years, there has been a known technique for allowing users to take a snapshot of a two-dimensional code attached on an image processing apparatus, such as a quick response (QR) code (registered trademark), with a camera of a portable terminal apparatus; and allowing the portable terminal apparatus to perform the following: analyzing the two-dimensional code obtained by the camera to detect address information of the image processing apparatus; registering the image processing apparatus on the portable terminal apparatus; generating a job such as a print job in accordance with an application installed on the portable terminal apparatus to operate the image processing apparatus from the portable terminal apparatus; and transmitting the print job to the image processing apparatus registered on the portable terminal apparatus (see Japanese Unexamined Patent Publications No. 2006-001063 and No. 2007-034443, for example).

Conventionally, an image processing apparatus can be registered on a portable terminal apparatus even if it does not support an application for operating the image processing apparatus, which is installed on the portable terminal apparatus, and even if it is in a state such that it hardly can be operated from the portable terminal apparatus, for example in the event of breakdown. This can cause inconvenience; i.e., the image processing apparatus registered on the portable terminal apparatus may not be able to provide services in response to a print job from the portable terminal apparatus.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

A first aspect of the present invention relates to a portable terminal apparatus including:

a two-dimensional code obtaining portion that obtains a two-dimensional code indicating address information of an image processing apparatus;

an address information judgment portion that analyzes the two-dimensional code obtained by the two-dimensional code obtaining portion and judges whether or not the two-dimensional code includes an IP address of the image processing apparatus;

an access portion that accesses the image processing apparatus residing at the IP address through a network upon the two-dimensional code being judged as including the IP address by the address information judgment portion;

an MIB information obtaining portion that obtains MIB information of the image processing apparatus from the image processing apparatus being accessed by the access portion; and a registration portion that judges whether or not the image processing apparatus can be operated from the portable terminal apparatus by an image processing apparatus operation application being activated, the image processing apparatus operation application being installed on the portable terminal apparatus, on the basis of the MIB information obtained by the MIB information obtaining portion and registers information for use of the image processing apparatus upon the image processing apparatus being judged as being able to be operated from the portable terminal apparatus.

A second aspect of the present invention relates to a method of registering an image processing apparatus, the method to be implemented by a portable terminal apparatus, the method including:

obtaining a two-dimensional code indicating address information of the image processing apparatus;

analyzing the obtained two-dimensional code and judging whether or not the two-dimensional code includes an IP address of the image processing apparatus;

accessing the image processing apparatus residing at the IP address through a network upon the two-dimensional code being judged as including the IP address;

obtaining MIB information of the image processing apparatus from the image processing apparatus being accessed through the network; and judging whether or not the image processing apparatus can be operated from the portable terminal apparatus by an image processing apparatus operation application being activated, the image processing apparatus operation application being installed on the portable terminal apparatus, on the basis of the MIB information obtained from the image processing apparatus and registering information for use of the image processing apparatus upon the image processing apparatus being judged as being able to be operated from the portable terminal apparatus.

A first aspect of the present invention relates to a non-transitory computer-readable recording medium having an image processing apparatus registration program stored thereon to make a computer of an image processing apparatus execute:

obtaining a two-dimensional code indicating address information of the image processing apparatus;

analyzing the obtained two-dimensional code and judging whether or not the two-dimensional code includes an IP address of the image processing apparatus;

accessing the image processing apparatus residing at the IP address through a network upon the two-dimensional code being judged as including the IP address by the address information judgment portion;

obtaining MIB information of the image processing apparatus from the image processing apparatus being accessed through the network; and judging whether or not the image processing apparatus can be operated from the portable terminal apparatus by an image processing apparatus operation application being activated, the image processing apparatus operation application being installed on the portable terminal apparatus, on the basis of the MIB information obtained from the image processing apparatus and registering information for use of the image processing apparatus upon the image processing apparatus being judged as being able to be operated from the portable terminal apparatus.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which.

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Hereinafter, some embodiments of the present invention will be described in combination with the accompanying drawings.

Figure 1:
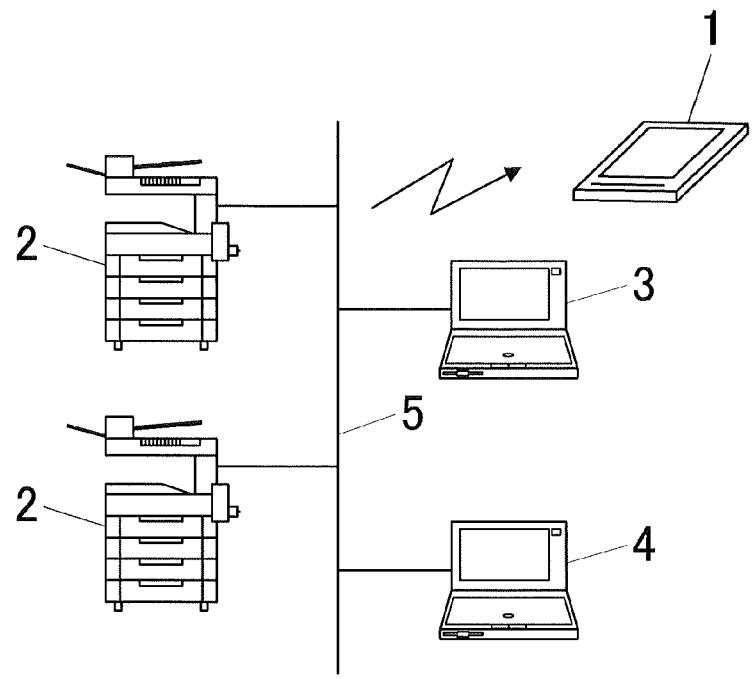
FIG. 1 illustrates a configuration of an image processing apparatus registration system having a portable terminal apparatus according to one embodiment of the present invention and an image processing apparatus.

FIG. 1 illustrates a configuration of an image processing apparatus registration system having a portable terminal apparatus according to one embodiment of the present invention and an image processing apparatus.

The job execution system is provided with: a portable terminal apparatus 1 such as a smartphone or a tablet computer terminal; one or more image processing apparatuses 2; a web server 3; a personal computer 4; and others, all of which are physically or wirelessly connected to each other through a network 5.

In this embodiment, the image processing apparatus 2 is represented by a multi-function peripheral (MFP) that is a multifunctional digital image forming apparatus having multiple functions such as copier function, printer function, facsimile function, and scanner function. Hereinafter, the image processing apparatus 2 will also be referred to as MFP 2.

Figure 2:
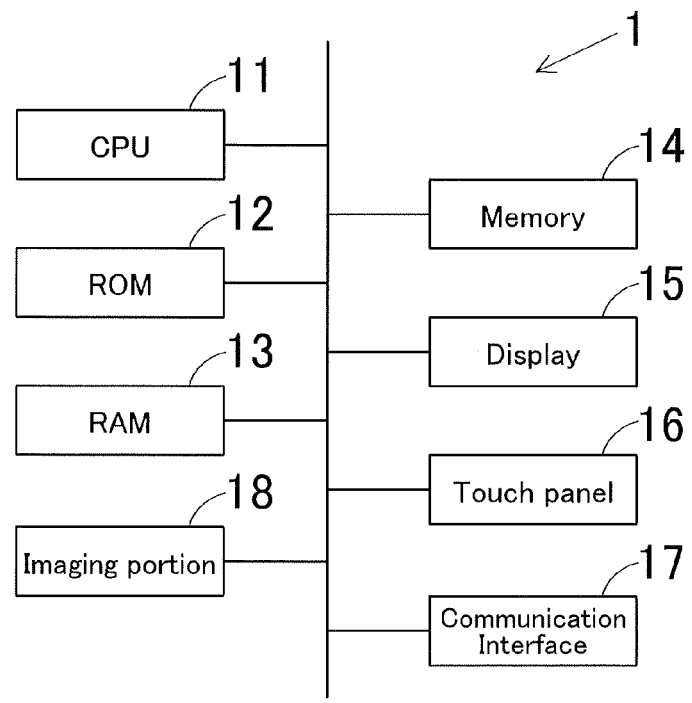
FIG. 2 is a block diagram illustrating an electrical configuration of the portable terminal apparatus.

FIG. 2 is a block diagram illustrating an electrical configuration of the portable terminal apparatus 1.

The portable terminal apparatus 1 is provided with: a CPU 11; a ROM 12; a RAM 13; a memory 14; a display 15; a touch panel 16; a communication interface (communication IF) 17; an imaging portion 18; and others.

The CPU 11 controls the entire portable terminal apparatus 1 in a unified and systematic manner in accordance with an OS, various applications for data processing, an application for operating the MFP 2, and other software installed on the portable terminal apparatus 1, which will be later described in detail.

The ROM 12 is a memory that stores operation programs for the CPU 11 and other data; the RAM 13 is a memory that provides a work area when the CPU 11 executes the operation programs.

The memory 14 is a memory that stores the OS, the applications, and other data.

The display 15, which is liquid-crystal for example, serves to display instructions and messages for users. The touch panel 16, which is provided over the display 15, detects a user's touch and identifies the coordinate at which the user touches on a screen.

The communication interface 17 supports telephone calls over a telephone circuit and wireless data communications with external apparatuses such as the MFP 2 and the web server 3 through an access point.

The imaging portion 18, which is provided with a snapshot camera not shown in the figure, takes a snapshot of a two-dimensional code attached on the MFP 2, such as a QR code (registered trademark), and snapshots of other objects.

The QR code is an example of two-dimensional code into which address information of the MFP 2 is converted. In this embodiment, the address information of the MFP 2 includes the following of the MFP 2: an internet protocol (IP) address; a host name used in a dynamic host configuration protocol (DHCP) situation, i.e., a domain name system (DNS) name; subnet mask information; and a media access control (MAC) address.

Figure 3:
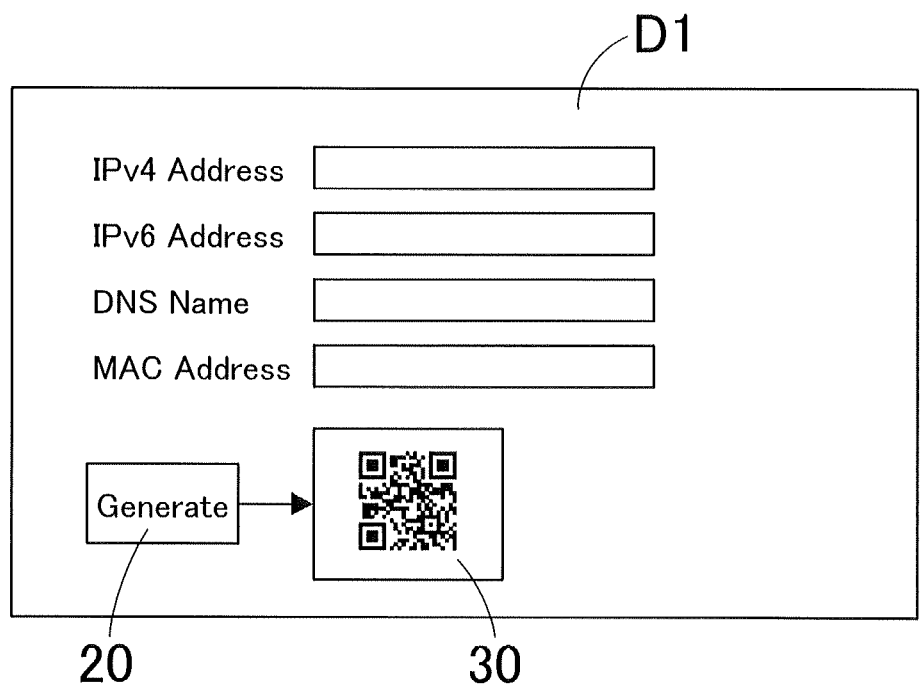
FIG. 3 illustrates a two-dimensional code generation screen.

The two-dimensional code may be generated by any of the following: the MFP 2; an application on a website; an application installed on a personal computer; and an application installed on the portable terminal apparatus 1. FIG. 3 is a two-dimensional code generation screen D1 that is shown on a display of a computer terminal, for example. When a user inputs an IPv4 address, an IPv6 address, a DNS name, a MAC address, and other information and presses a generate button 20, a two-dimensional code 30 is generated.

This embodiment suggests an example of configuration, in which a two-dimensional code generated as described above is printed out and attached on the MFP 2 and the portable terminal apparatus 1 obtains the two-dimensional code by the imaging portion 18 taking a snapshot of it. Alternatively, a two-dimensional code generated on a computer terminal as described above may be transmitted directly to an application installed on the portable terminal apparatus 1 such that the portable terminal apparatus 1 can obtain the two-dimensional code.

Hereinafter, an operation of the portable terminal apparatus 1 will be described in detail with reference to the flowchart of FIG. 4.

The portable terminal apparatus 1 has an application installed thereon, which allows the portable terminal apparatus 1 to analyze a two-dimensional code obtained by its camera, register the MFP 2, and generate a print job for the MFP 2 to perform printing. The operation indicated by the flowchart of FIG. 4 is performed by the CPU 11 of the portable terminal apparatus 1 in accordance with a program such as the application. The MFP 2 may be registered by its own name or other information or by information that is necessary for use of the MFP 2.

Upon a user activating the application, a start button appears on the display 15 and the routine waits until the following manipulation (NO in Step S01). Upon the user pressing the start button (YES in Step S01), the routine waits until the user taking a snapshot of a two-dimensional code (NO in Step S02). Upon the user taking a snapshot of a two-dimensional code attached on the MFP 2 with the imaging portion 18 (YES in Step S02), the portable terminal apparatus 1 analyzes the entered two-dimensional code and judges whether or not it is in accordance with a specified format in Step S03.

Figures 6, 7:
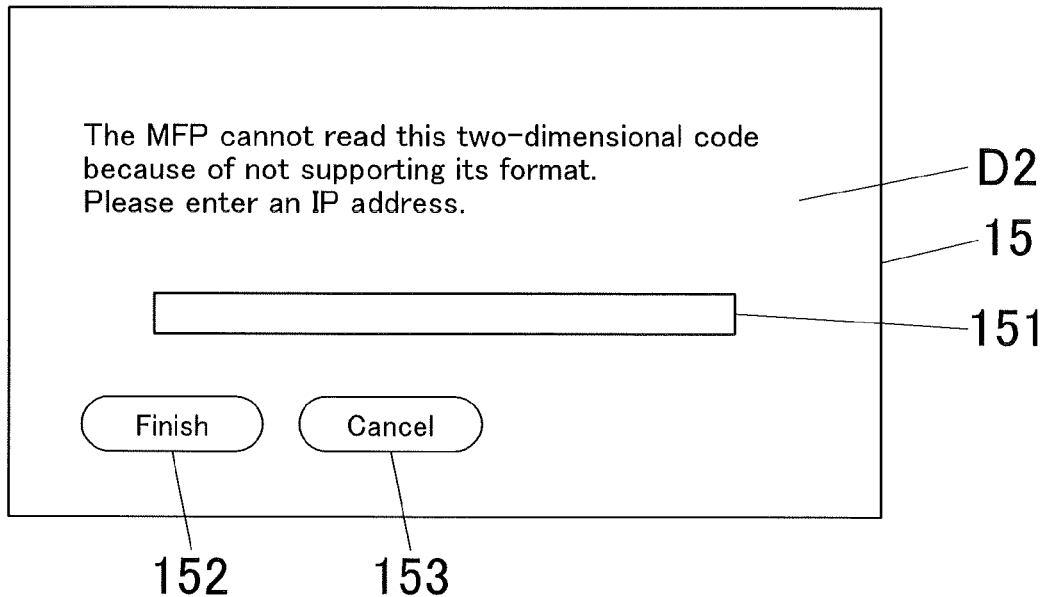
FIG. 6 illustrates a screen to be shown if a two-dimensional code is out of regulation format.
FIG. 7 illustrates a table containing MIB information stored on the image processing apparatus.

If the two-dimensional code is not in accordance with a specified format (NO in Step S03), the routine proceeds to Step S14 in which, as demonstrated in FIG. 6, a screen D2 including the following objects: a message as "the MFP cannot read this two-dimensional code because of not supporting its format; please enter an IP address"; an IP address entry field 151; a finish button 152; and a cancel button 153 appears on the display 15.

In Step S15, the routine waits until an IP address is entered (NO in Step S15). If an IP address is entered and the finish button 152 is pressed (YES in Step S15), the routine proceeds to Step S17 of FIG. 5. If the cancel button 153 is pressed, the routine terminates.

Back to Step S03, if the two-dimensional code is in accordance with a specified format (YES in Step S03), then it is judged in Step S04 whether or not the two-dimensional code includes IP address information. The IP address information may indicate either or both of an IP address and a DNS name corresponding to the IP address.

If the two-dimensional code does not include IP address information (NO in Step S04), the routine proceeds to Step S16 in which a screen including the following objects: a message stating that the two-dimensional code does not include IP address information; an IP address entry field; a finish button; and a cancel button appears on the display 15. Then the routine proceeds to Step S15.

Back to Step S04, if the two-dimensional code includes IP address information (YES in Step S04), then it is judged in Step S05 whether or not the two-dimensional code includes MAC address information. If it includes MAC address information (YES in Step S05), the routine proceeds to Step S06. If it does not include MAC address information (NO in Step S05), the routine proceeds to Step S17.

In Step S06, the portable terminal apparatus 1 accesses the MFP 2 residing at an IP address indicated by the IP address information and obtains MAC address information from management information base (MIB) that is management information of the MFP 2.

FIG. 7 demonstrates MIB information stored on the MFP 2. In this embodiment, the MIB information is defined by the following information objects: an IPv4 address; a IPv6 address; a DNS name; a MAC address; printer language information; a sysOID (sysObjectID); status information; option information; DHCP configuration; a model name; and a sysname. The sysOID (sysObjectID) is an ID for identifying the model name of the MFP 2; the status information is information indicating the current status of the MFP 2, for example run out of paper and service call error status that requires a service person to come; the option information is information of an optional device such as an automatic document feeder (ADF). The DHCP configuration indicates ON or OFF; if it indicates ON, the MFP 2 has a dynamic IP address; if it indicates OFF, the MFP 2 has a static IP address.

Back to Step S06, MAC address information is obtained from the MIB information, or alternatively, the entire MIB information including MAC address information may be obtained in this step.

In Step S07, it is judged whether or not a MAC address in the two-dimensional code is identical with a MAC address from the MIB information stored on the MFP 2. If a MAC address in the two-dimensional code is identical with a MAC address from the MIB information (YES in Step S07), it seems most likely that an IP address in the two-dimensional code is identical with an IP address of the MFP 2 actually having the two-dimensional code attached thereon. The routine proceeds to Step S17.

If a MAC address in the two-dimensional code is not identical with a MAC address from the MIB information (NO in Step S07), it seems most likely that an IP address in the two-dimensional code is not identical with an IP address of the MFP 2 actually having the two-dimensional code attached thereon, i.e., that the MFP 2 actually having the two-dimensional code attached thereon now has a different IP address. The routine proceeds to Step S08.

In Step S08, the portable terminal apparatus 1 by unicast routing accesses a plurality of MFPs 2 within a range of a plurality of IP addresses based on the IP address in the two-dimensional code, each having a fixed network address and a changeable host address, and searches for MAC addresses of the MFPs 2. For example, if the IP address "192.168.1.xx" has the three high-order bits "192.168.1." as a fixed network address and "xx" as a changeable host address, the portable terminal apparatus 1 accesses the MFPs 2 in order within a range of the IP addresses "192.128.1.2" to "192.128.1.254". In other words, the portable terminal apparatus 1 searches the network for a MFP 2 residing at an IP address corresponding to the MAC address in the two-dimensional code.

Figure 8:
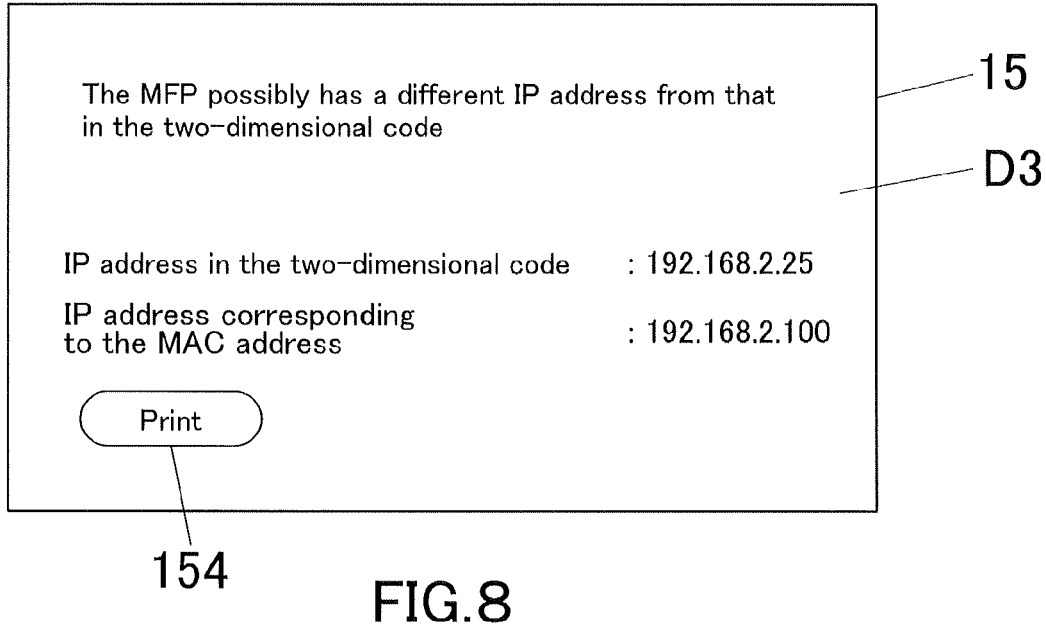
FIG. 8 illustrates a screen to be shown in a case where there is an image processing apparatus residing at an identical MAC address with a MAC address in the two-dimensional code while the MAC address in the two-dimensional code is not identical with a MAC address from the MIB information of an image processing apparatus residing at an IP address in the two-dimensional code.

In Step S09, it is judged whether or not there is a MFP 2 residing at an identical MAC address with the MAC address in the two-dimensional code. If there is such a MFP 2 (YES in Step S09), the routine proceeds to Step S10 in which, as demonstrated in FIG. 8, a screen D3 including the following objects: a message as "the MFP possibly has a different IP address from that in the two-dimensional code"; an IP address in the two-dimensional code; an IP address of the MFP 2 residing at the MAC address found out in Step S08; and a print button 154 appears on the display 15. Then the routine proceeds to Step S12 of FIG. 5. The message allows users to recognize that they need to update the two-dimensional code attached on the MFP 2.

Figure 9:
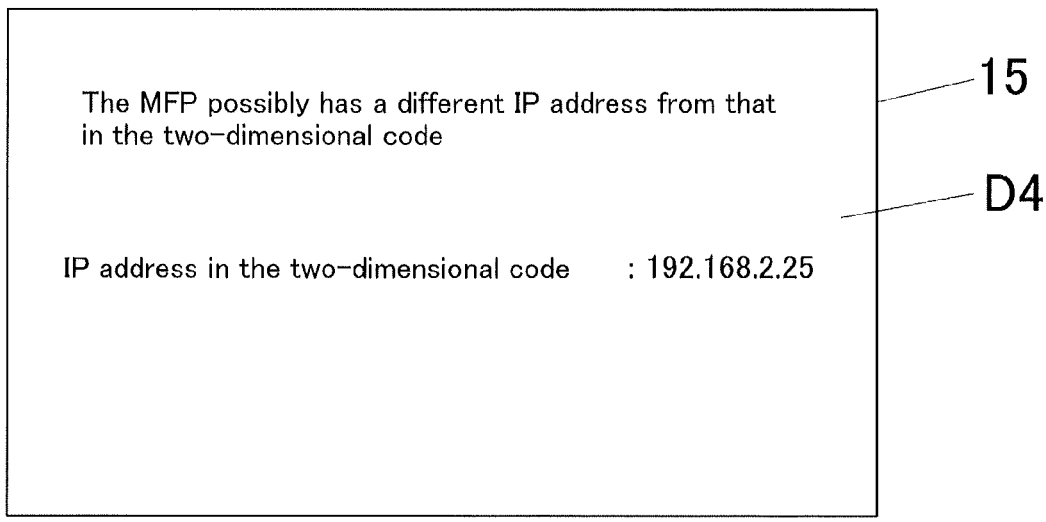
FIG. 9 illustrates a screen to be shown in a case where there is no image processing apparatus residing at an identical MAC address with a MAC address in the two-dimensional code while the MAC address in the two-dimensional code is not identical with a MAC address from the MIB information of an image processing apparatus residing at an IP address in the two-dimensional code.

Back to Step S09, if there is no MFP 2 residing at an identical MAC address with the MAC address in the two-dimensional code (NO in Step S09), the routine proceeds to Step S11 in which, as demonstrated in FIG. 9, a screen D4 including only the following objects: a message as "the MFP possibly has a different IP address from that in the two-dimensional code"; and an IP address in the two-dimensional code appears on the display 15. Then the routine terminates. The message allows users to recognize that they need to update the two-dimensional code attached on the MFP 2.

In Step S12, it is judged whether or not the print button 154 is pressed. If it is pressed (YES in Step S12), the routine proceeds to Step S13 in which a new two-dimensional code including the following objects: the MAC address in the entered two-dimensional code; and an IP address of the MFP 2 residing at this MAC address is generated and a print job for printing the new two-dimensional code is transmitted to the MFP 2. Then the routine proceeds to Step S17. The MFP 2 receives the print job; upon the MFP 2 printing out the new two-dimensional code on paper, users can attach the new two-dimensional code on the MFP 2 in replacement of the last two-dimensional code. Thus users are allowed to read the new two-dimensional code attached thereon and register the right MFP 2 on the portable terminal apparatus 1.

Back to Step S12, if the print button 154 is not pressed (NO in Step S12), the routine proceeds to Step S17 directly.

In Step S17, the portable terminal apparatus 1 accesses a MFP 2 residing at any of the following addresses: a manually entered IP address; the IP address in the two-dimensional code in a case where the two-dimensional code includes IP address information but does not include MAC address information; or an IP address corresponding to the MAC address in the two-dimensional code, and obtains the MIB information as demonstrated in FIG. 7.

MIB information may be obtained from the MFP 2 before Step S13 and the DHCP configuration may indicate ON in the MIB information. In such a case, the IP address should be dynamic thus in Step S13, the new two-dimensional code needs to include a DNS name instead of this IP address. Alternatively, the DHCP configuration may indicate OFF. In such a case, the IP address should be static thus in Step S13, the new two-dimensional code only needs to include this IP address.

After the MIB information is obtained, it is judged whether or not the MFP 2 can be operated from the portable terminal apparatus 1 by a MFP operation application being activated, on the basis of the MIB information.

More specifically, it is judged in Step S18 whether or not the model name of the MFP 2, which is indicated by the sysOID, matches any device supporting the application installed on the portable terminal apparatus 1. If it matches any device supporting the application (YES in Step S18), then it is judged in Step S19 whether or not the printer language is supported by the application. If it is supported by the application (YES in Step S19), then it is judged in Step S20 whether or not the status information indicates that the MFP 2 is out of service. The MFP 2 is out of service because of being in a serious trouble that requires a service person to come (service call error), for example.

If the MFP 2 is not out of service (NO in Step S20), this means that the MFP 2 can be operated from the portable terminal apparatus 1. Thus in Step S21, model name information and sysname information, which are a part of the MIB information, appear on the display 15 and a register button is enabled. Alternatively, the entire MIB information may appear on the display 15 in this step.

Subsequently in Step S22, the routine waits until the register button is pressed (NO in Step S22); if it is pressed (YES in Step S22), the MFP 2 is registered in Step S23.

In any of the following cases: if the model name does not match any device supporting the application (NO in Step S18); if the printer language is not supported by the application (NO in Step S19); and if the status information indicates out of service status (YES in Step S20), the routine proceeds to Step S24 in which an error message as "service is not available because of a trouble" appears on the display 15. Then the routine terminates. In this case, the MFP 2 is not registered accordingly.

Alternatively, the portable terminal apparatus 1 may be configured such that it is judged whether or not the MFP 2 is capable of printing and scanning on the basis of the option information and if it is not capable of printing or scanning, the MFP 2 is not registered.

As described above, in this embodiment, it is judged whether or not the MFP 2 can be operated from the portable terminal apparatus 1 by a MFP operation application being activated, which is installed on the portable terminal apparatus 1, on the basis of MIB information obtained from the MFP 2. If the MFP 2 cab be operated from the portable terminal apparatus 1, the MFP 2 is registered on the portable terminal apparatus 1; if users cannot operate the MFP 2 because the MFP 2 does not support the application or the MFP 2 is breakdown, the MFP 2 is not registered on the portable terminal apparatus 1. This achieves in preventing the inconvenience; i.e., the MFP 2 is never registered if service is not available.

Figure 4:
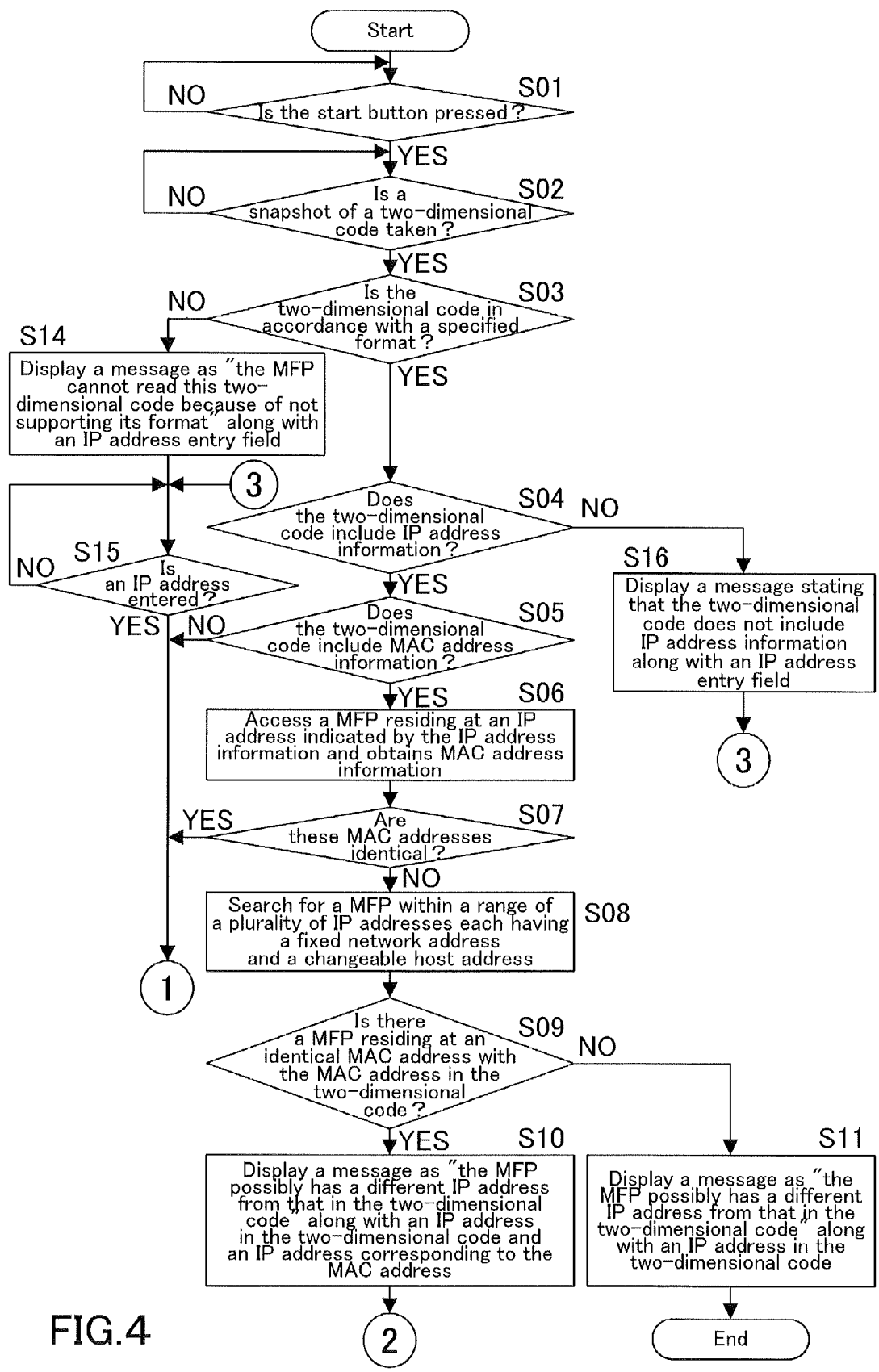
FIG. 4 is a flowchart representing an operation of the portable terminal apparatus.

Furthermore, in this embodiment, just like after a user enters a two-dimensional code, for example by taking a snapshot of it, the routine continues to the following steps from Step S17 of FIG. 4: accessing the MFP 2; obtaining MIB information therefrom; judging whether or not the MFP 2 can be operated from the portable terminal apparatus 1, on the basis of the MIB information; and registering the MFP 2 if the MFP 2 can be operated, after a user enters an IP address in Step S15. Hardware or a program for executing these steps can be developed as a common module both for manual entry and photographic entry, so there is no need to prepare different modules for them. This allows the portable terminal apparatus 1 to have a simple configuration.

While one embodiment of the present invention has been described in detail herein and shown in the accompanying drawings, it should be understood that the present invention is not limited to the foregoing embodiment.

Figure 5:
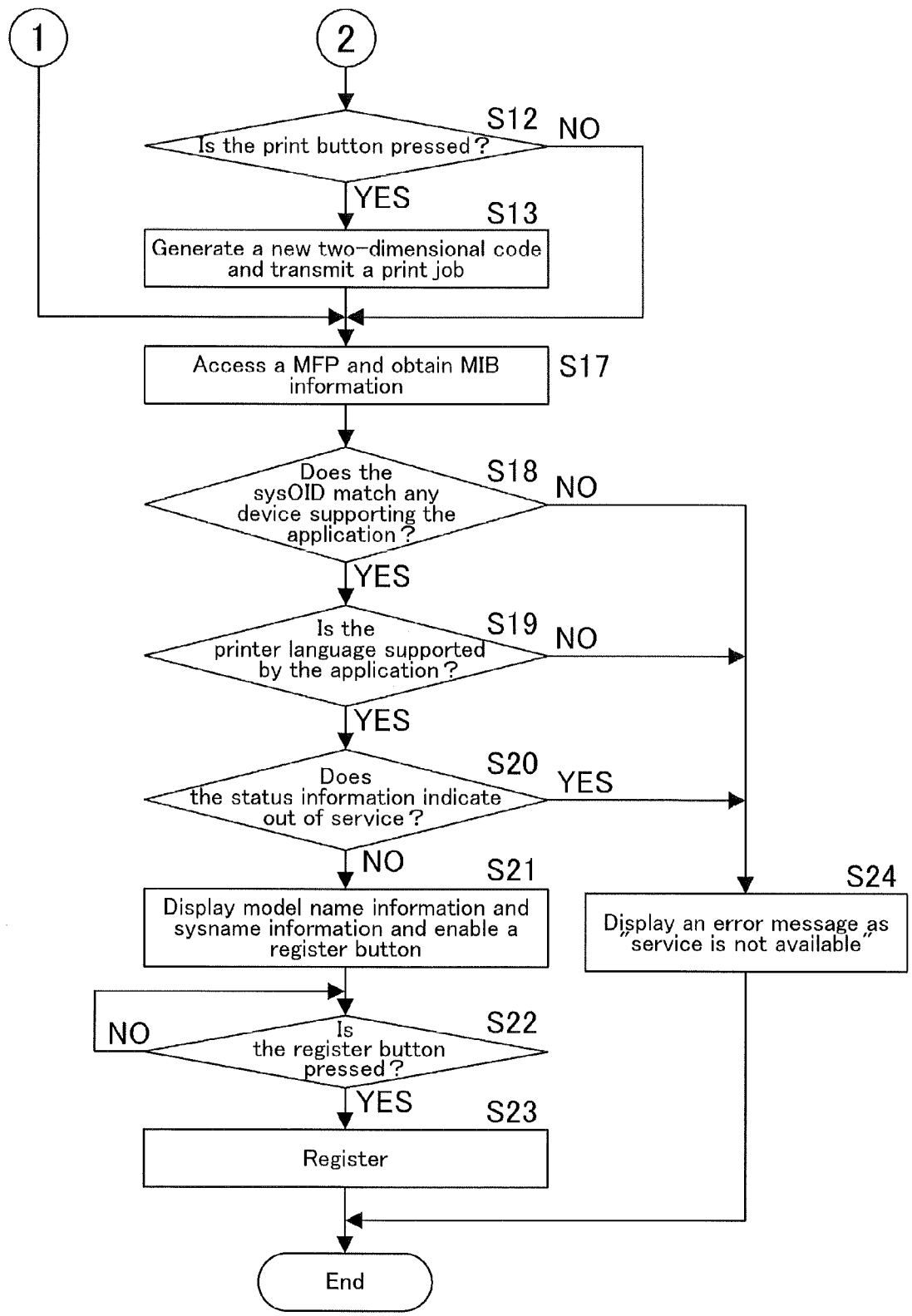
FIG. 5 is a subsequent flowchart following FIG. 4.

For example, in order to improve user-friendliness, the flowchart of FIG. 4 and FIG. 5 may be modified such that the following user-related steps: showing an IP address entry field in Step S14; entering an IP address in Step S15; pressing the print button in Step S12; and pressing the register button in Step S22 are omitted and the steps from entering a two-dimensional code in Step S02 to registering the MFP 2 in Step S23 are automatically performed without user manipulation.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g. of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to". In this disclosure and during the prosecution of this application, means-plus-function or step-plus-function limitations will only be employed where for a specific claim limitation all of the following conditions are present In that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example", and "NB" which means "note well".

What is claimed is:

1. A portable terminal apparatus comprising:
    a two-dimensional code obtaining portion that obtains a two-dimensional code indicating address information of an image processing apparatus;
    an address information judgment portion that analyzes the two-dimensional code obtained by the two-dimensional code obtaining portion and judges whether or not the two-dimensional code includes an IP address of the image processing apparatus;
    an access portion that accesses the image processing apparatus residing at the IP address through a network upon the two-dimensional code being judged as including the IP address by the address information judgment portion;
    an MIB information obtaining portion that obtains management information base (MIB) information of the image processing apparatus from the image processing apparatus being accessed by the access portion; and
    a registration portion that judges whether or not the image processing apparatus can be operated from the portable terminal apparatus by an image processing apparatus operation application being activated, the image processing apparatus operation application being installed on the portable terminal apparatus, on the basis of the MIB information obtained by the MIB information obtaining portion and registers information for use of the image processing apparatus upon the image processing apparatus being judged as being able to be operated from the portable terminal apparatus.

2. The portable terminal apparatus as recited in claim 1, wherein while the two-dimensional code further includes a MAC address of the image processing apparatus, the MIB information further includes a MAC address, the MIB information being obtained by the MIB information obtaining portion, the portable terminal apparatus further comprises a comparison portion that compares the MAC address included in the two-dimensional code and the MAC address included in the MIB information.

3. The portable terminal apparatus as recited in claim 2, wherein a message stating that the image processing apparatus identified by the two-dimensional code now has a different IP address is displayed upon the MAC addresses being judged as not being identical as a result of the comparison by the comparison portion, the MAC addresses being included in the two-dimensional code and the MIB information, respectively.

4. The portable terminal apparatus as recited in claim 2, further comprising:
    a search portion that searches for an image processing apparatus MIB information of which includes a MAC address identical with the MAC address included in the two-dimensional code, within a range of a plurality of IP addresses based on the IP address included in the two-dimensional code, the plurality of IP addresses each being composed of a fixed network address and a changeable host address, upon the MAC addresses being judged as not being identical as a result of the comparison by the comparison portion, the MAC addresses being included in the two-dimensional code and the MIB information, respectively;
    a two-dimensional code generator that is capable of generating a two-dimensional code including an IP address of the image processing apparatus being found out by the search portion, the image processing apparatus having MIB information including an identical MAC address with the MAC address included in the two-dimensional code; and
    a print job generator that generates a print job for printing the two-dimensional code generated by the two-dimensional code generator.

5. The portable terminal apparatus as recited in claim 1, wherein a series of operations is automatically performed without user manipulation, the series of operations starting from analyzing the two-dimensional code and judging whether or not the two-dimensional code includes the IP address by the address information judgment portion until judging by the registration portion whether or not the image processing apparatus can be operated from the portable terminal apparatus.

6. The portable terminal apparatus as recited in claim 1, wherein the MIB information is partially or entirely displayed at a time when information for use of the image processing apparatus is registered by the registration portion.

7. The portable terminal apparatus as recited in claim 1, wherein:
    an IP address entry screen for the user to enter an IP address manually is displayed in a case where an address information judgment portion fails to analyze the two-dimensional code;
    the following operations are caused by the user entering an IP address via the IP address entry screen:
    the access portion accesses an image processing apparatus through the network, the image processing apparatus having the IP address entered by the user via the IP address entry screen;
    the MIB information obtaining portion obtains MIB information of the image processing apparatus from the image processing apparatus being accessed by the access portion;
    the registration portion judges on the basis of the MIB information whether or not the image processing apparatus can be operated from the portable terminal apparatus by the image processing apparatus operation application being activated; and upon the image processing apparatus being judged as being able to be operated from the portable terminal apparatus, the registration portion registers information for use of the image processing apparatus.

8. A method of registering an image processing apparatus, the method to be implemented by a portable terminal apparatus, the method comprising:
　　obtaining a two-dimensional code indicating address information of the image processing apparatus;
　　analyzing the obtained two-dimensional code and judging whether or not the two-dimensional code includes an IP address of the image processing apparatus;
　　accessing the image processing apparatus residing at the IP address through a network upon the two-dimensional code being judged as including the IP address;
　　obtaining management information base (MIB) information of the image processing apparatus from the image processing apparatus being accessed through the network; and
　　judging whether or not the image processing apparatus can be operated from the portable terminal apparatus by an image processing apparatus operation application being activated, the image processing apparatus operation application being installed on the portable terminal apparatus, on the basis of the MIB information obtained from the image processing apparatus and registering information for use of the image processing apparatus upon the image processing apparatus being judged as being able to be operated from the portable terminal apparatus.

9. The method of registering the image processing apparatus as recited in claim 8, wherein while the two-dimensional code further includes a MAC address of the image processing apparatus, the MIB information further includes a MAC address, the MIB information being obtained from the image processing apparatus, the method further comprising comparing the MAC address included in the two-dimensional code and the MAC address included in the MIB information.

10. The method of registering the image processing apparatus as recited in claim 9, wherein a message stating that the image processing apparatus identified by the two-dimensional code now has a different IP address is displayed upon the MAC addresses being judged as not being identical as a result of the comparison, the MAC addresses being included in the two-dimensional code and the MIB information, respectively.

11. The method of registering the image processing apparatus as recited in claim 9, further comprising:
　　searching for an image processing apparatus MIB information of which includes a MAC address identical with the MAC address included in the two-dimensional code, within a range of a plurality of IP addresses based on the IP address included in the two-dimensional code, the plurality of IP addresses each being composed of a fixed network address and a changeable host address, upon the MAC addresses being judged as not being identical as a result of the comparison, the MAC addresses being included in the two-dimensional code and the MIB information, respectively;
　　generating a two-dimensional code including an IP address of the image processing apparatus being found out, the image processing apparatus having MIB information including an identical MAC address with the MAC address included in the two-dimensional code; and
　　generating a print job for printing the generated two-dimensional code.

12. The method of registering the image processing apparatus as recited in claim 8, wherein a series of operations is automatically performed without user manipulation, the series of operations starting from analyzing the two-dimensional code and judging whether or not the two-dimensional code includes the IP address until judging whether or not the image processing apparatus can be operated from the portable terminal apparatus.

13. The method of registering the image processing apparatus as recited in claim 8, wherein the MIB information is partially or entirely displayed at a time when information for use of the image processing apparatus is registered.

14. The method of registering the image processing apparatus as recited in claim 8, wherein:
　　an IP address entry screen for the user to enter an IP address manually is displayed in a case where the analysis of the two-dimensional code fails;
　　the following operations are caused by the user entering an IP address via the IP address entry screen:
　　an image processing apparatus is accessed through the network, the image processing apparatus having the IP address entered by the user via the IP address entry screen;
　　MIB information of the image processing apparatus is obtained from the image processing apparatus being accessed through the network;
　　it is judged on the basis of the MIB information whether or not the image processing apparatus can be operated from the portable terminal apparatus by the image processing apparatus operation application being activated; and
　　upon the image processing apparatus being judged as being able to be operated from the portable terminal apparatus, information for use of the image processing apparatus is registered.

15. A non-transitory computer-readable recording medium having an image processing apparatus registration program stored thereon to make a computer of an image processing apparatus execute:
　　obtaining a two-dimensional code indicating address information of the image processing apparatus;
　　analyzing the obtained two-dimensional code and judging whether or not the two-dimensional code includes an IP address of the image processing apparatus;
　　accessing the image processing apparatus residing at the IP address through a network upon the two-dimensional code being judged as including the IP address by the address information judgment portion;
　　obtaining MIB information of the image processing apparatus from the image processing apparatus being accessed through the network; and
　　judging whether or not the image processing apparatus can be operated from the portable terminal apparatus by an image processing apparatus operation application being activated, the image processing apparatus operation application being installed on the portable terminal apparatus, on the basis of the management information base (MIB) information obtained from the image processing apparatus and registering information for use of the image processing apparatus upon the image processing apparatus being judged as being able to be operated from the portable terminal apparatus.

16. The non-transitory computer-readable recording medium as recited in claim 15, having the image processing apparatus registration program stored thereon, wherein while the two-dimensional code further includes a MAC address of the image processing apparatus, the MIB information further includes a MAC address, the MIB information being obtained from the image processing apparatus, the image processing apparatus registration program to make the computer further execute comparing the MAC address included in the two-dimensional code and the MAC address included in the MIB information.

17. The non-transitory computer-readable recording medium as recited in claim 16, having the image processing apparatus registration program stored thereon, wherein a message stating that the image processing apparatus identified by the two-dimensional code now has a different IP address is displayed upon the MAC addresses being judged as not being identical as a result of the comparison, the MAC addresses being included in the two-dimensional code and the MIB information, respectively.

18. The non-transitory computer-readable recording medium as recited in claim 16, having the image processing apparatus registration program stored thereon to make the computer further execute:
   searching for an image processing apparatus MIB information of which includes a MAC address identical with the MAC address included in the two-dimensional code, within a range of a plurality of IP addresses based on the IP address included in the two-dimensional code, the plurality of IP addresses each being composed of a fixed network address and a changeable host address, upon the MAC addresses being judged as not being identical as a result of the comparison, the MAC addresses being included in the two-dimensional code and the MIB information, respectively;
   generating a two-dimensional code including an IP address of the image processing apparatus being found out, the image processing apparatus having MIB information including an identical MAC address with the MAC address included in the two-dimensional code; and
   generating a print job for printing the generated two-dimensional code.

19. The non-transitory computer-readable recording medium as recited in claim 15, having the image processing apparatus registration program stored thereon, wherein a series of operations is automatically performed without user manipulation, the series of operations starting from analyzing the two-dimensional code and judging whether or not the two-dimensional code includes the IP address until judging whether or not the image processing apparatus can be operated from the portable terminal apparatus.

20. The non-transitory computer-readable recording medium as recited in claim 15, having the image processing apparatus registration program stored thereon, wherein the MIB information is partially or entirely displayed at a time when information for use of the image processing apparatus is registered.

21. The non-transitory computer-readable recording medium as recited in claim 15, having the image processing apparatus registration program stored thereon, wherein:
   an IP address entry screen for the user to enter an IP address manually is displayed in a case where the analysis of the two-dimensional code fails;
   the following operations are caused by the user entering an IP address via the IP address entry screen:
   an image processing apparatus is accessed through the network, the image processing apparatus having the IP address entered by the user via the IP address entry screen;
   MIB information of the image processing apparatus is obtained from the image processing apparatus being accessed through the network;
   it is judged on the basis of the MIB information whether or not the image processing apparatus can be operated from the portable terminal apparatus by the image processing apparatus operation application being activated; and
   upon the image processing apparatus being judged as being able to be operated from the portable terminal apparatus, information for use of the image processing apparatus is registered.

* * * * *